US011313951B2

(12) United States Patent
Chen et al.

(10) Patent No.: US 11,313,951 B2
(45) Date of Patent: Apr. 26, 2022

(54) GROUND DETECTION METHOD, ELECTRONIC DEVICE, AND VEHICLE

(71) Applicant: BAIDU ONLINE NETWORK TECHNOLOGY (BEIJING) CO., LTD., Beijing (CN)

(72) Inventors: Dongming Chen, Beijing (CN); Hao Wang, Beijing (CN); Liang Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 316 days.

(21) Appl. No.: 16/566,487

(22) Filed: Sep. 10, 2019

(65) Prior Publication Data

US 2020/0081096 A1    Mar. 12, 2020

(30) Foreign Application Priority Data

Sep. 12, 2018  (CN) .......................... 201811063969.8

(51) Int. Cl.
*G01S 7/48*       (2006.01)
*G01S 17/42*      (2006.01)
*G06K 9/00*       (2022.01)
*G01S 17/931*     (2020.01)

(52) U.S. Cl.
CPC ............ *G01S 7/4808* (2013.01); *G01S 17/42* (2013.01); *G01S 17/931* (2020.01); *G06K 9/00791* (2013.01)

(58) Field of Classification Search
CPC ...... G01S 17/931; G01S 17/42; G01S 7/4808; G06T 7/11; G06T 2207/10028; G06T 2207/30252; G06K 9/00791

USPC .......................................................... 702/159
See application file for complete search history.

(56) References Cited

U.S. PATENT DOCUMENTS

| 7,995,055 | B1 * | 8/2011 | Ma ........................ G06K 9/6215 345/420 |
| 8,260,539 | B2 | 9/2012 | Zeng |
| 2013/0218472 | A1 * | 8/2013 | Fu ............................ G06T 7/11 702/5 |
| 2016/0154999 | A1 | 6/2016 | Fan et al. |

(Continued)

FOREIGN PATENT DOCUMENTS

| CN | 104143194 A | 11/2014 |
| CN | 105551082 A | 5/2016 |
| CN | 106371104 A | 2/2017 |

(Continued)

OTHER PUBLICATIONS

Office Action for Chinese Application No. 201811063969.8, dated Jan. 18, 2021, 12 pages.

(Continued)

*Primary Examiner* — John H Le
(74) *Attorney, Agent, or Firm* — Fay Sharpe LLP

(57) ABSTRACT

Embodiments of the present disclosure provide a ground detection method and apparatus, an electronic device, a vehicle, and a storage medium. The method includes: projecting a laser point cloud obtained to a high resolution mesh and a low resolution mesh respectively; filtering out candidate ground points in the high resolution mesh; and performing ground fitting based on the candidate ground points in the low resolution mesh.

15 Claims, 3 Drawing Sheets

(56) References Cited

U.S. PATENT DOCUMENTS

2018/0225515 A1     8/2018   Jiang et al.

FOREIGN PATENT DOCUMENTS

| | | |
|---|---|---|
| CN | 106918819 A | 7/2017 |
| CN | 106951847 A | 7/2017 |
| CN | 106997049 A | 8/2017 |
| CN | 107064955 A | 8/2017 |
| CN | 107272019 A | 10/2017 |
| JP | 2013093008 A | 5/2013 |
| JP | 2017166933 A | 9/2017 |

OTHER PUBLICATIONS

Office Action for Japanese Application No. 2019166001, dated Sep. 29, 2020, 10 pages.
Detection of Passable Area with Multi-Element Synthesis of Off-Road Environment of Ground Unmanned Vehicles, 4 pages, year 2015.
Ehsan Javanmardi et al., "Autonomous Vehicle Selflocalization Based on Abstract Map and Multi-Channel LiDAR in Urban Area", 2018, 1 page.
Office Action for Chinese Application 201811063969.8, dated Mar. 31, 2020.
Extended European Search Report for EP Application No. 19196331.3, dated Dec. 23, 2019, 10 pages.

\* cited by examiner

GROUND DETECTION METHOD, ELECTRONIC DEVICE, AND VEHICLE

CROSS-REFERENCE TO RELATED APPLICATION

This application claims priority to and benefits of Chinese Patent Application Serial No. 201811063969.8, filed with the State Intellectual Property Office of P. R. China on Sep. 12, 2018, the entire content of which is incorporated herein by reference.

FIELD

Embodiments of the present disclosure relate to a field of unmanned driving vehicle technologies, and more particularly to a ground detection method, an electronic device, and a vehicle.

BACKGROUND

An unmanned vehicle senses surrounding environment of the vehicle through various sensors, and controls a steering and a velocity of the vehicle according to sensed roads, a sensed vehicle position and sensed obstacles, such that the vehicle may travel on the road safely and reliably.

Detecting ground points and fitting a ground equation in laser point clouds is a foundation module for the sense of the vehicle. Effect of detecting the ground points directly influences obstacle detection, obstacle classification, obstacle tracking and the like.

SUMMARY

Embodiments of the present disclosure provide a ground detection method. The method includes:

projecting a laser point cloud obtained to a high resolution mesh and a low resolution mesh respectively;

filtering out candidate ground points in the high resolution mesh; and performing ground fitting based on the candidate ground points in the low resolution mesh.

Embodiments of the present disclosure also provide a ground detection apparatus. The apparatus includes: a projection module, a filtering module, and a fitting module.

The projection module is configured to project a laser point cloud obtained to a high resolution mesh and a low resolution mesh respectively.

The filtering module is configured to filter out candidate ground points in the high resolution mesh.

The fitting module is configured to perform ground fitting based on the candidate ground points in the low resolution mesh.

Embodiments of the present disclosure also provide an electronic device. The device includes one or more processors and a memory. The memory is configured to store one or more programs. When the one or more programs are executed by the one or more processors, the one or more processors are caused to implement the ground detection method according to any one of embodiments of the present disclosure.

Embodiments of the present disclosure also provide a vehicle. The vehicle includes a vehicle body, a laser radar, and an electronic device according to the above embodiment.

Embodiments of the present disclosure provide a storage medium having a computer program stored thereon. When the computer program is executed by a processor the processor is caused to implement the ground detection method according to any one of embodiments of the present disclosure.

DETAILED DESCRIPTION

Detailed description will be further made in the following to the present disclosure with reference to the accompanying drawings and the embodiments. It should be understood that, detailed embodiments described herein are intended only to explain the present disclosure, and are not intended to limit the present disclosure. In addition, it should be also noted that, for the convenience of description, only some contents but not all of the contents related to the present disclosure are illustrated in the accompanying drawings.

Embodiment 1

Figure 1:
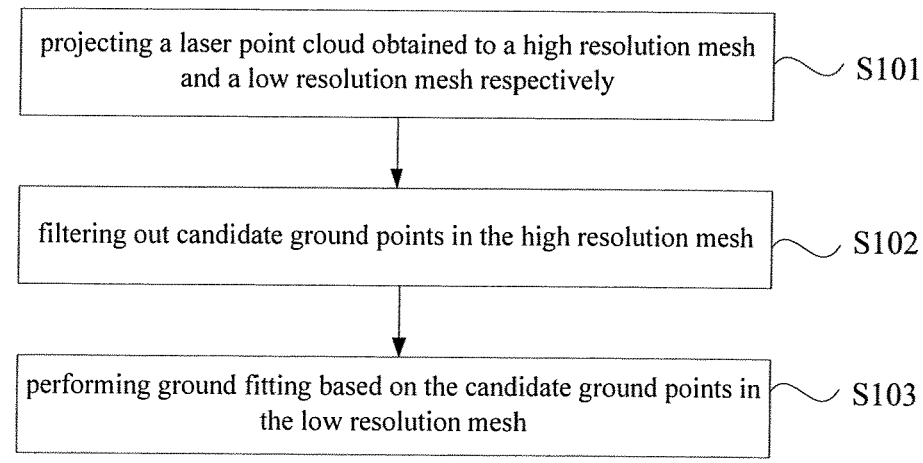
FIG. 1 is a flow chart illustrating a ground detection method provided in Embodiment 1 of the present disclosure.

FIG. 1 is a flow chart illustrating a ground detection method provided in Embodiment 1 of the present disclosure. The method may be executed by a ground detection apparatus or an electronic device. The apparatus or the electronic device may be implemented in a form of software and/or hardware. The apparatus or the electronic device may be integrated in any intelligent device having a network communication function, such as a vehicle. The vehicle may be an unmanned vehicle. As illustrated in FIG. 1, the ground detection method may include following actions.

At block S110, a laser point cloud obtained is projected to a high resolution mesh and a low resolution mesh respectively.

In an embodiment of the present disclosure, the laser point cloud may be also referred as a point cloud. A space coordinate of each sample point on the surface of an object is obtained under one space reference system by using laser, and a set of a series of massive points representing a target space distribution and a target surface characteristic is obtained. Such set of massive points is referred as the point cloud. Attributes of the point cloud may include spatial resolution, positional accuracy, a surface normal vector and the like. The electronic device may project the obtained laser point cloud to the high resolution mesh and to the low resolution mesh respectively. Comparing with the grids in the low resolution mesh, the grids in the high resolution mesh are more and denser.

For example, a laser radar may be provided on a vehicle. The laser radar may include a plurality of laser transmitters. The laser radar scans around the vehicle according to a certain frequency, to obtain a laser point cloud around the vehicle at real time. Since points in the laser point cloud is points in the space, for convenience of analysis, in embodiments of the present disclosure, the laser point cloud is projected to a mesh firstly, thus there may be a cluster of points in each grid of the mesh after the projection, then which of the cluster of points in each grid belong to ground points is recognized, and finally ground fitting is performed based on the ground points to obtain a ground equation.

At block S120, candidate ground points are filtered out in the high resolution mesh.

At block S130, ground fitting is performed based on the candidate ground points in the low resolution mesh.

In a detailed embodiment of the present disclosure, the electronic device may filter out the candidate ground points in the high resolution mesh, and then perform the ground fitting based on the candidate ground points in the low resolution mesh.

It should be noted that, comparing with the low resolution mesh, the grids in the high resolution mesh are more and denser. That is, after the projection, points in the original laser point cloud are divided into more clusters of points in the high resolution mesh. As a result, there are fewer points projected to each grid in the high resolution mesh than the points projected to each grid in the low resolution mesh. The points of the laser point cloud projected to the mesh include points belonging to the ground, points belonging to the environment, points of the obstacle and lots of noise points. These points cause interference for recognition of the ground. Therefore, it may be more stable and accurate to determine the candidate ground points based on the points in each grid of the high resolution mesh. Correspondingly, in the low resolution mesh, since there are more points in each grid, it may be more stable and accurate by utilizing more points to fit the ground. In embodiments of the present disclosure, by utilizing characteristics of meshes with different resolutions, the candidate ground points are filtered out from the high resolution mesh, and the ground fitting is performed based on these candidate ground points in the low resolution mesh, thus further improving stability and accuracy of the ground fitting.

In detail, any existing algorithm such as a ransac (Random Sample Consensus) algorithm, may be utilized in combination with the characteristics of the ground points for filtering, and any existing algorithm may also be utilized to perform the ground fitting on the filtered out candidate ground points to obtain a final ground equation. A detailed part about the algorithm will not be elaborated in this embodiment.

With the ground detection method provided in embodiments of the present disclosure, the laser point cloud obtained is projected to the high resolution mesh and the low resolution mesh respectively, then the candidate ground points are filtered out from the high resolution mesh, and finally the ground fitting is performed based on the candidate ground points in the low resolution mesh. In other words, in the technical solution of the present disclosure, the candidate ground points may be filtered out from the high resolution mesh firstly, and then the ground fitting is performed based on the candidate ground points in the low resolution mesh. However, the ground detection method in the related art may not meet demand for a quick, accurate and comprehensive detection. Therefore, comparing with the related art, with the ground detection method provided in embodiments of the present disclosure, the ground detection may be performed more quickly, accurately and comprehensively, and the technical solution provided in embodiments of the present disclosure is simple and convenient to implement, and convenient to popularize, with wider application range.

Embodiment 2

Figure 2:
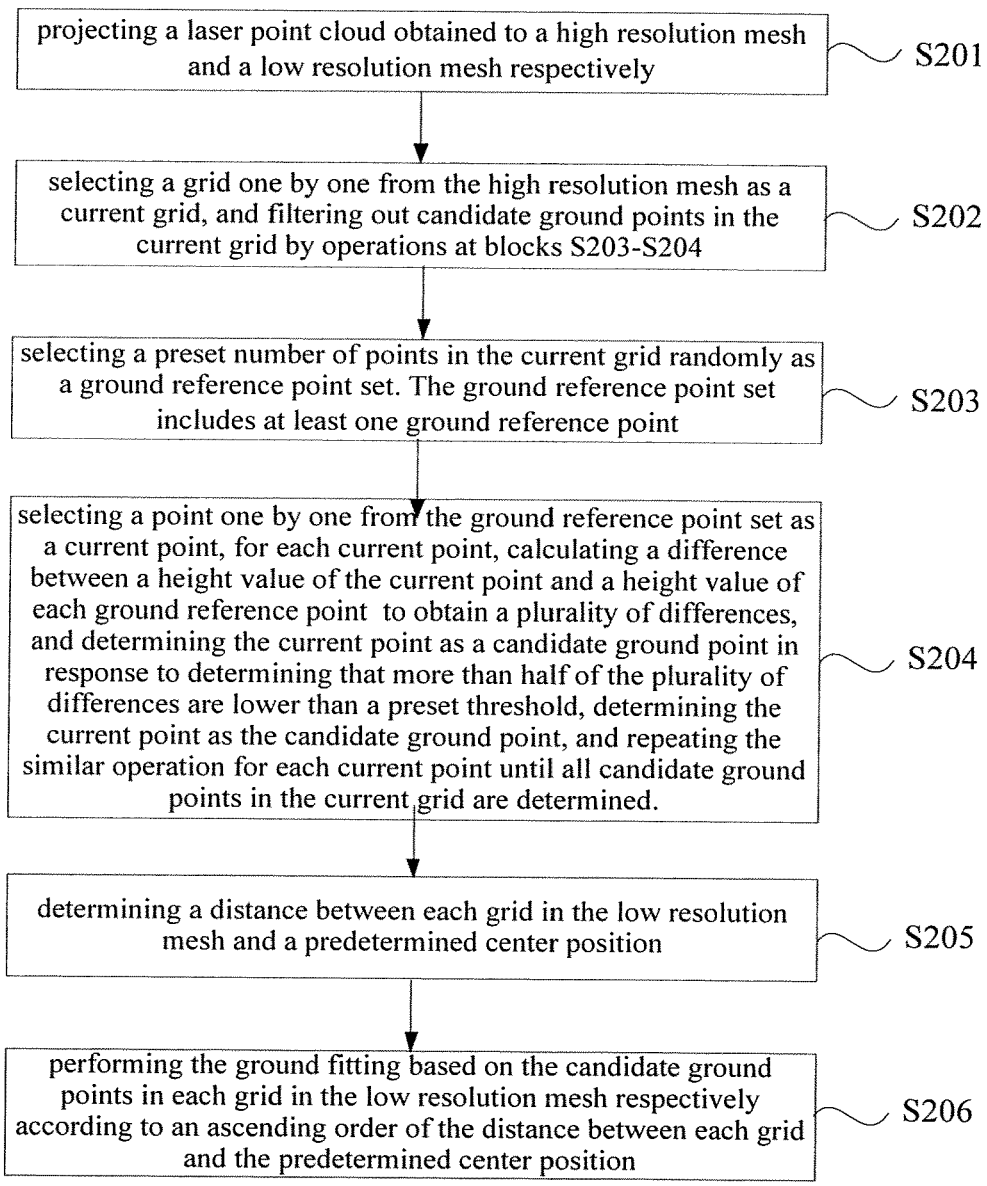
FIG. 2 is a flow chart illustrating a ground detection method provided in Embodiment 2 of the present disclosure.

FIG. 2 is a flow chart illustrating a ground detection method provided in Embodiment 2 of the present disclosure. This embodiment is a further optimization based on the above embodiment. As illustrated in FIG. 2, the ground detection method may include following actions.

At block S201, a laser point cloud obtained is projected to a high resolution mesh and a low resolution mesh respectively.

At block S202, a grid is selected one by one from the high resolution mesh as a current grid, and candidate ground points are filtered out in the current grid by operations at blocks S203-S204.

At block S203, a preset number of points in the current grid are randomly selected as a ground reference point set. The ground reference point set includes at least one ground reference point.

At block S204, a point is selected one by one from the ground reference point set as a current point, for each current point, a difference between a height value of the current point and a height value of each ground reference point is calculated to obtain a plurality of differences, and the current point is determined as a candidate ground point in response to determining that more than half of the plurality of differences are lower than a preset threshold, the current point is determined as the candidate ground point, and the similar operations are repeated for each current point until all candidate ground points in the current grid are determined.

The above blocks S202-S204 are further optimization for how to filter out the candidate ground points in the high resolution mesh. For example, it is assumed that the laser point cloud is projected to the high resolution mesh and the number of grids contained in the high resolution mesh is N, which are: grid 1, grid 2, . . . , and grid N. N is a natural number greater than 1. At this block, an electronic device may select a grid from the N grids as the current grid one by one. It is assumed that the electronic device selects grid 1 as the current grid firstly. Then, the electronic device may select a preset number of points in grid 1 randomly as the ground reference point set. The ground reference point set includes at least one ground reference point. Next, the electronic device may select a point A from the ground reference point set as the current point. For the point A, the electronic device may calculate a different between a height value of the point A and a height value of each ground reference point to obtain a plurality of differences. When more than half of the plurality of differences are lower than the preset threshold, the point A is determined as the candidate ground point. Then the electronic device may select a point B in the ground reference point set as the current point. For the point B, the electronic device may calculate a difference between a height value of the point B and the height value of each ground reference point to obtain a plurality of differences. When more than half of the plurality of differences are lower than the preset threshold, the point B is determined as the candidate ground point. Based on the similar principle, all the candidate ground points at grid 1 are determined. Then, the electronic device may select grid 2 as the current grid, and repeat the above operations until all the candidate ground points at grid 2 are determined. Based on the similar principle, the above operations are repeated until all the candidate ground points at grid N are determined.

At block S205, a distance between each grid in the low resolution mesh and a predetermined center position is determined.

In a detailed embodiment of the present disclosure, the electronic device may determine the distance between each grid in the low resolution mesh and the predetermined center position. In detail, the electronic device may take the laser transmitter as a center. The laser transmitter scans around to obtain the laser point cloud, and then projects the laser point cloud to the low height resolution mesh. Thus a center of the low resolution mesh is the predetermined center position. Therefore, the distance between each grid in the low resolution mesh and the predetermined center position may be determined. For example, grids at a neighboring circle around the predetermined center position are closest to the predetermined center position, while grids at the outermost circle around the predetermined center position are farthest from the predetermined center position.

At block S206, the ground fitting is performed based on the candidate ground points in each grid in the low resolution mesh respectively according to an ascending order of the distance between each grid and the predetermined center position.

In a detailed embodiment of the present disclosure, the electronic device may perform the ground fitting based on the candidate ground points in each grid in the low resolution mesh according to the ascending order of the distance between each grid in the low resolution mesh and the predetermined center position. Grids having different distances to the predetermined center point have different noise degrees. The grids closest to the predetermined center are least affected by the noise points. Therefore, the grids having a closest distance is fitted first, and after ground equations at these grids having a closest distance are fitted, noise points in other grids may be filtered based on the fitted ground equations, such that the final fitted ground is more stable and accurate.

In detail, the electronic device may determine initial grids around the predetermined center position firstly, and the ground fitting is performed in each initial grid based on the candidate ground points in each initial grid to determine ground points in each initial grid. Then, based on the ascending order of the distance between each grid in the low resolution mesh and the predetermined center position, the ground fitting is performed on each of remaining grids in the low resolution mesh sequentially based on following operations until the fitting is performed on all the grids in the low resolution mesh. The operations include: for a current grid to be fitted, performing primary filtering on the candidate ground points in the current grid to be fitted based on an average value of height values of center points of fitted grids in 8 neighborhoods around the current grid to be fitted to obtain filtered candidate ground points, and performing the ground fitting on the current grid to be fitted based on the filtered candidate ground points.

With the ground detection method provided in embodiments of the present disclosure, the laser point cloud obtained is projected to the high resolution mesh and the low resolution mesh respectively first, then the candidate ground points are filtered out from the high resolution mesh, the ground fitting is performed based on the candidate ground points in the low resolution mesh, and finally the ground fitting is performed based on the candidate ground points each grid in the low resolution mesh according to the ascending order of the distance between each grid in the low resolution mesh and the predetermined center position, thus improving stability and accuracy of the fitting result.

Embodiment 3

Figure 3:
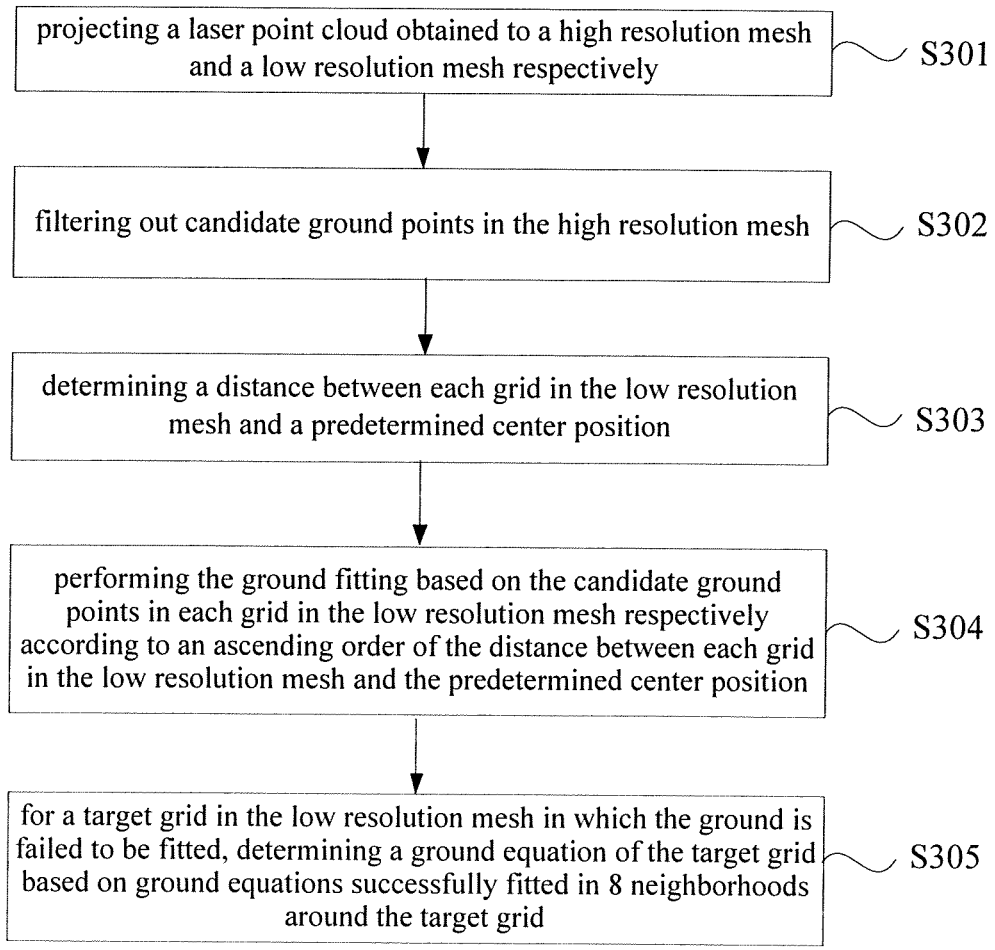
FIG. 3 is a flow chart illustrating a ground detection method provided in Embodiment 3 of the present disclosure.

FIG. 3 is a flow chart illustrating a ground detection method provided in Embodiment 3 of the present disclosure. This embodiment is a further optimization based on the above embodiment. As illustrated in FIG. 3, the ground detection method may include following actions.

At block S301, a laser point cloud obtained is projected to a high resolution mesh and a low resolution mesh respectively.

At block S302, candidate ground points are filtered out in the high resolution mesh.

At block S303, a distance between each grid in the low resolution mesh and a predetermined center position is determined.

At block S304, the ground fitting is performed based on the candidate ground points in each grid in the low resolution mesh respectively according to an ascending order of the distance between each grid in the low resolution mesh and the predetermined center position.

At block S305, for a target grid in the low resolution mesh in which the ground is failed to be t fitted, a ground equation of the target grid is determined based on ground equations successfully fitted in 8 neighborhoods around the target grid.

In a detailed embodiment of the present disclosure, in the low resolution mesh, for the target grid where the ground failed to be fitted, the electronic device may determine the ground equation of the target grid according to the ground equations successfully fitted in the 8 neighborhoods around the target grid. It should be noted that, there are few or even no candidate ground point in some grids. For example, in an area such as flower beds beside a road where the vehicle travels, the laser radar may not scan the ground points, while the ground equations of these grids has an important effect on subsequent necessary operations such as obstacle detection. Therefore, there is also a need to perform extension on grids where the ground is failed to be fitted based on the fitted ground equations of the grids in which the ground is fitted, such that the ground equation may be fitted for each grid in the low resolution mesh.

In detail, the electronic device may obtain a number of ground points in each of at least one grid fitted with the ground around the target grid, determine a weight of each of the at least one grid fitted with the ground based on the number of ground points, and obtain the ground equation of the target grid by performing weighted averaging on a ground equation and the weight of each of the at least one grid fitted with the ground.

In other words, the more the number of ground points in a grid in which the ground is fitted, the more stable the ground equation of the grid is. Therefore, the weights of the grids around the target grid in which the ground points are fitted are determined by utilizing the number of the fitted ground points, and the ground equation of the target grid may be determined in combination with the weights, thus the extension may be implemented accurately.

With the ground detection method provided in embodiments of the present disclosure, the laser point cloud obtained is projected to the high resolution mesh and the low resolution mesh respectively first, then the candidate ground points are filtered out from the high resolution mesh, and finally the ground fitting is performed based on the candidate ground points in the low resolution mesh. In addition, for the grid in the low resolution mesh in which the ground point is failed to be fitted, the ground equation of each grid in which the ground is failed to be fitted is further determined according to the weight and the ground equation of each grid fitted with the ground around the grid in which the ground point is failed to be fitted. In this way, the extension is performed on the fitted ground, a more comprehensive ground detection result in embodiments of the present disclosure is achieved, and some necessary operations of the vehicle such as detecting a target obstacle may be further performed more effectively.

Embodiment 4

Figure 4:
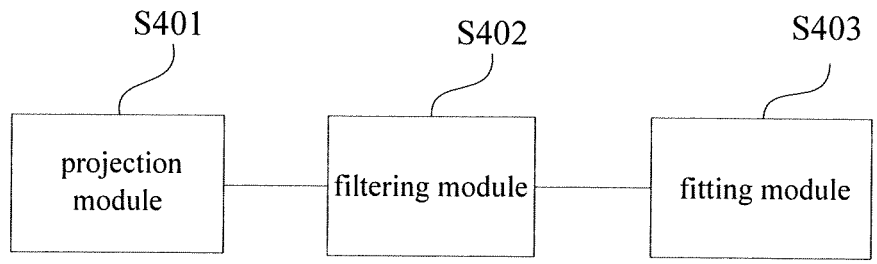
FIG. 4 is a block diagram illustrating a ground detection apparatus provided in Embodiment 4 of the present disclosure.

FIG. 4 is a block diagram illustrating a ground detection apparatus provided in Embodiment 4 of the present disclosure. As illustrated in FIG. 4, the ground detection apparatus according to embodiments of the present disclosure may include: a projection module 401, a filtering module 402, and a fitting module 403.

The projection module 401 is configured to project a laser point cloud obtained to a high resolution mesh and a low resolution mesh respectively.

The filtering module 402 is configured to filter out candidate ground points in the high resolution mesh.

The fitting module 403 is configured to perform ground fitting based on the candidate ground points in the low resolution mesh.

Further, the filtering module 402 is configured to select a grid one by one from the high resolution mesh as a current grid, and to filter out candidate ground points in the current grid by: selecting a preset number of points in the current grid randomly as a ground reference point set, in which, the ground reference point set includes at least one ground reference point; selecting a point one by one from the ground reference point set as a current point; for each current point, calculating a difference between a height value of the current point and a height value of each ground reference point to obtain a plurality of differences, and determining the current point as a candidate ground point in response to determining that more than half of the plurality of differences are lower than a preset threshold, so as to determine all candidate ground points in the current grid.

Figure 5:
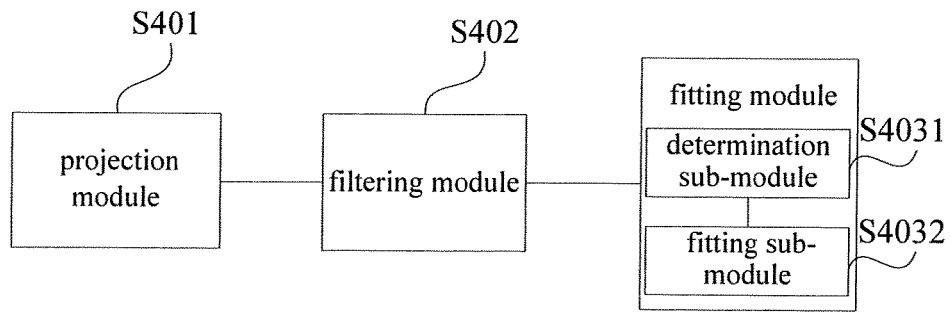
FIG. 5 is a block diagram illustrating a ground detection apparatus provided in Embodiment 4 of the present disclosure.

FIG. 5 is a block diagram illustrating a ground detection apparatus provided in Embodiment 4 of the present disclosure. As illustrated in FIG. 5, the fitting module 403 includes: a determination sub-module 4031 and a fitting sub-module 4032.

The determination sub-module 4031 is configured to determine a distance between each grid in the low resolution mesh and a predetermined center position.

The fitting sub-module 4032 is configured to perform the ground fitting based on the candidate ground points in each grid in the low resolution mesh respectively according to an ascending order of the distance between each grid in the low resolution mesh and the predetermined center position.

Further, the fitting sub-module 4032 is configured to: determine initial grids around the predetermined center position, and perform the ground fitting in each initial grid based on the candidate ground points in each initial grid to determine ground points in each initial grid; and based on the ascending order of the distance between each grid in the low resolution mesh and the predetermined center position, perform the ground fitting on each of remaining grids in the low resolution mesh sequentially based on an operation until the ground fitting is performed on all the grids in the low resolution mesh. The operation includes: for a current grid to be fitted, performing primary filtering on the candidate ground points in the current grid to be fitted based on an average value of height values of center points of fitted grids in 8 neighborhoods around the current grid to be fitted to obtain filtered candidate ground points, and performing the ground fitting on the current grid to be fitted based on the filtered candidate ground points.

The above ground detection apparatus may execute the method provided according to any embodiment of the present disclosure, and have the corresponding function modules and benefit effects. The technical details which are not described in detail in this embodiment may refer to the ground detection method provided in any of embodiments of the present disclosure.

Embodiment 5

Figure 6:
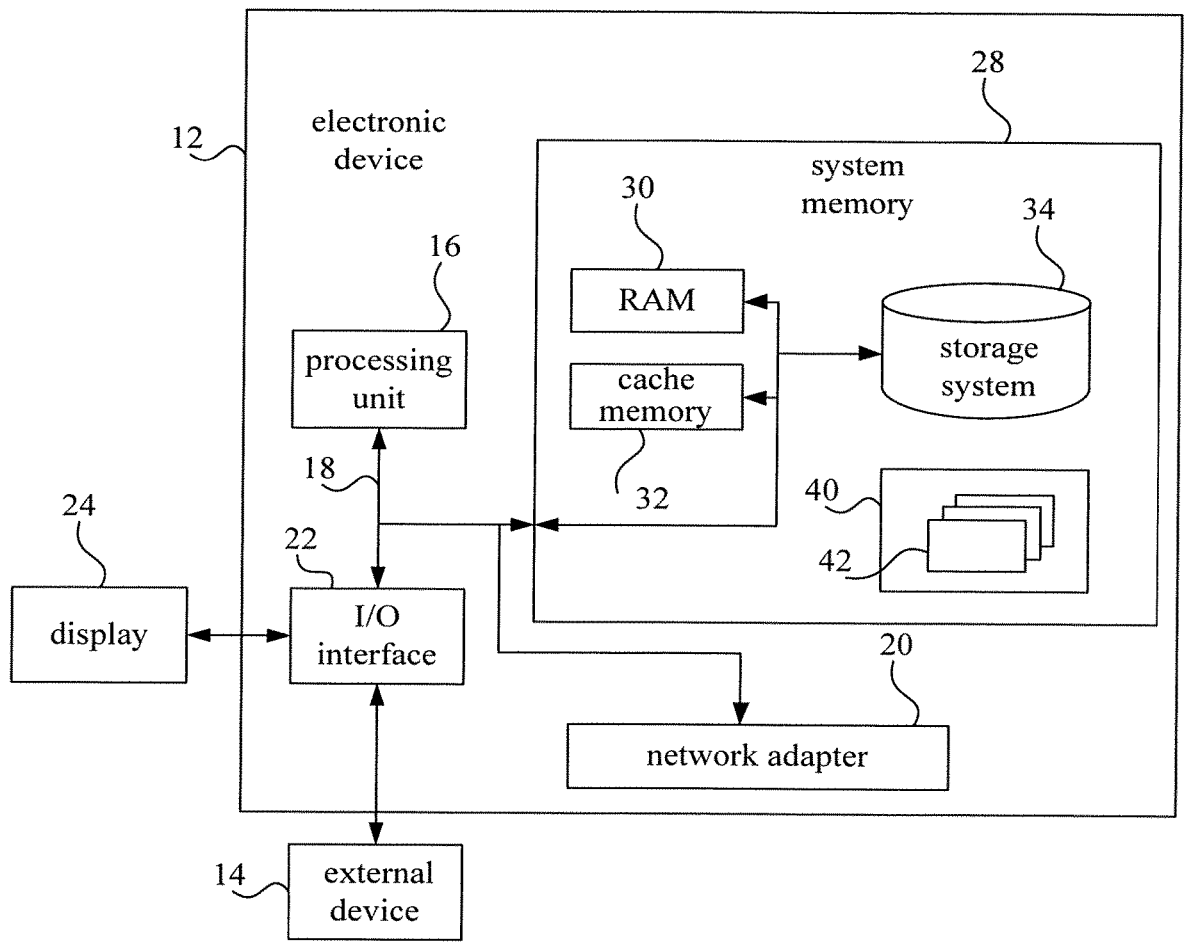
FIG. 6 is a block diagram illustrating an electronic device provided in Embodiment 5 of the present disclosure.

FIG. 6 is a block diagram illustrating an electronic device provided in Embodiment 5 of the present disclosure. FIG. 6 illustrates a block diagram of an exemplary electronic device applicable to implement implementations of the present disclosure. The electronic device 12 illustrated in FIG. 6 is only an example, which may not bring any limitation to functions and application scope of embodiments of the present disclosure.

As illustrated in FIG. 6, the electronic device 12 is embodied in the form of a general-purpose computing device. Components of the electronic device 12 may include but not limited to: one or more processors or processing units 16, a system memory 28, and a bus 18 connecting different system components (including the system memory 28 and the processing unit 16).

The bus 18 represents one or more of several bus structures, including a storage bus or a storage controller, a peripheral bus, an accelerated graphics port, a processor, or a local bus with any bus structure in the plurality of bus structures. For example, these architectures include but not limited to an industry standard architecture (ISA) bus, a micro channel architecture (MAC) bus, an enhanced ISA bus, a video electronics standards association (VESA) local bus and a peripheral component interconnection (PCI) bus.

The electronic device 12 typically includes a plurality of computer system readable mediums. These mediums may be any usable medium that may be accessed by the electronic device 12, including volatile and non-volatile mediums, removable and non-removable mediums.

The system memory 28 may include computer system readable mediums in the form of volatile medium, such as a random access memory (RAM) 30 and/or a cache memory 32. The electronic device 12 may further include other removable/non-removable, volatile/non-volatile computer system storage mediums. Only as an example, the storage system 34 may be configured to read from and write to non-removable, non-volatile magnetic mediums (not illustrated in FIG. 6, and usually called "a hard disk driver"). Although not illustrated in FIG. 6, a magnetic disk driver configured to read from and write to the removable non-volatile magnetic disc (such as "a diskette"), and an optical disc driver configured to read from and write to a removable non-volatile optical disc (such as a compact disc-read only memory (CD-ROM), a digital video disc-read only memory (DVD-ROM) or other optical mediums) may be provided. Under these circumstances, each driver may be connected with the bus 18 by one or more data medium interfaces. The system memory 28 may include at least one program product. The program product has a set of program modules (for example, at least one program module), and these program modules are configured to execute functions of respective embodiments of the present disclosure.

A program/utility tool 40, having a set (at least one) of program modules 42, may be stored, for example, in the system memory 28. Such program modules 42 include but not limited to an operating system, one or more application programs, other program modules, and program data. Each or any combination of these examples may include an implementation of a networking environment. The program module 42 usually executes functions and/or methods described in embodiments of the present disclosure.

The electronic device 12 may communicate with one or more external devices 14 (such as a keyboard, a pointing device, and a display 24), may also communicate with one or more devices enabling a user to interact with the electronic device 12, and/or may communicate with any device (such as a network card, and a modem) enabling the electronic device 12 to communicate with one or more other computing devices. Such communication may occur via an input/output (I/O) interface 22. Moreover, the electronic device 12 may further communicate with one or more networks (such as a local area network (LAN), a wide area network (WAN) and/or a public network, such as Internet) via a network adapter 20. As illustrated in FIG. 6, the network adapter 20 communicates with other modules of the electronic device 12 via the bus 18. It should be understood that, although not illustrated in FIG. 6, other hardware and/or software modules may be used in combination with the electronic device 12, including but not limited to: microcode, device drivers, redundant processing units, external disk drive arrays, RAID (redundant array of independent disks) systems, tape drives, and data backup storage systems, etc.

The processing unit 16, by operating programs stored in the system memory 28, executes various function applications and data processing, for example implements a ground detection method provided in embodiments of the present disclosure.

Embodiment 6

Embodiment 6 of the present disclosure also provides a computer storage medium.

The computer readable storage medium in embodiments of the present disclosure may employ any combination of one or more computer readable mediums. The computer readable medium may be a computer readable signal medium or a computer readable storage medium. The computer readable storage medium may be, for example, but not limited to an electronic, magnetic, optical, electromagnetic, infrared, or semiconductor system, apparatus or device, or any suitable combination of the foregoing. More specific examples (a non-exhaustive list) of the computer readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any appropriate combination of the foregoing. In this document, the computer readable storage medium can be any tangible medium that contains or stores a program. The program can be used by or in conjunction with an instruction execution system, apparatus or device.

The computer readable signal medium may include a data signal transmitted in the baseband or as part of a carrier, in which computer readable program codes are carried. The transmitted data signal may employ a plurality of forms, including but not limited to an electromagnetic signal, a light signal or any suitable combination thereof. The computer readable signal medium may further be any computer readable medium other than the computer readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing operations of the present disclosure may be programmed using one or more programming languages or the combination thereof. The programming languages include object-oriented programming languages, such as Java, Smalltalk, C++, and also include conventional procedural programming languages, such as the C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network (LAN) or a wide area network (WAN), or may be connected to an external computer (for example, through the Internet using an Internet service provider).

The above is only optimal embodiments of the present disclosure and technical principle applied thereto. It should be understood by the skilled in the art that, the present disclosure is not limited to the specific embodiment described herein. The skilled in the art may make various obvious changes, modifications and alternatives without departing from the scope of the present disclosure. Therefore, although a specific illustration is made to the present disclosure by the above embodiments, the present disclosure is not merely limited to the above embodiments. More other equivalent embodiments may also be included without departing from the technical idea of the present disclosure. The scope of the present disclosure is determined by the appended claims.

What is claimed is:

1. A ground detection method, comprising:
    projecting a laser point cloud obtained to a high resolution mesh and a low resolution mesh respectively;
    filtering out candidate ground points in the high resolution mesh; and
    performing ground fitting based on the candidate ground points in the low resolution mesh; wherein, filtering out the candidate ground points in the high resolution mesh comprises:
    selecting a grid one by one from the high resolution mesh as a current grid, and filtering out candidate ground points in the current grid by:
    selecting a preset number of points in the current grid randomly as a ground reference point set, wherein, the ground reference point set comprises at least one ground reference point;
    selecting a point one by one from the ground reference point set as a current point;
    for each current point, calculating a difference between a height value of the current point and a height value of each ground reference point to obtain a plurality of differences, and determining the current point as a candidate ground point in response to determining that more than half of the plurality of differences are lower than a preset threshold, so as to determine all candidate ground points in the current grid.

2. The method of claim 1, wherein, performing the ground fitting based on the candidate ground points in the low resolution mesh comprises:
  determining a distance between each grid in the low resolution mesh and a predetermined center position; and
  performing the ground fitting based on the candidate ground points in each grid in the low resolution mesh respectively according to an ascending order of the distance between each grid in the low resolution mesh and the predetermined center position.

3. The method of claim 2, wherein, performing the ground fitting based on the candidate ground points in each grid in the low resolution mesh respectively according to the ascending order of the distance between each grid in the low resolution mesh and the predetermined center position comprises:
  determining initial grids around the predetermined center position, and performing the ground fitting in each initial grid based on the candidate ground points in each initial grid to determine ground points in each initial grid; and
  based on the ascending order of the distance between each grid in the low resolution mesh and the predetermined center position, performing the ground fitting on each of remaining grids in the low resolution mesh sequentially until the ground fitting is performed on all the grids in the low resolution mesh by:
  for a current grid to be fitted, performing primary filtering on the candidate ground points in the current grid to be fitted based on an average value of height values of center points of fitted grids in 8 neighborhoods around the current grid to be fitted to obtain filtered candidate ground points, and performing the ground fitting on the current grid to be fitted based on the filtered candidate ground points.

4. The method of claim 2, further comprising:
  for a target grid in the low resolution mesh in which the ground is failed to be fitted, determining a ground equation of the target grid based on ground equations fitted in 8 neighborhoods around the target grid.

5. The method of claim 4, wherein, determining the ground equation of the target grid based on the ground equations fitted in the 8 neighborhoods around the target grid comprises:
  obtaining a number of ground points in each of at least one grid fitted with the ground around the target grid;
  determining a weight of each of the at least one grid fitted with the ground based on the number of ground points; and
  obtaining the ground equation of the target grid by performing weighted averaging on a ground equation and the weight of each of the at least one grid fitted with the ground.

6. An electronic device, comprising:
  one or more processors, and
  a memory, configured to store one or more programs that, when executed by the one or more processors, cause the one or more processors to implement a ground detection method, the method comprising:
  projecting a laser point cloud obtained to a high resolution mesh and a low resolution mesh respectively;
  filtering out candidate ground points in the high resolution mesh; and
  performing ground fitting based on the candidate ground points in the low resolution mesh; wherein, filtering out the candidate ground points in the high resolution mesh comprises:
  selecting a grid one by one from the high resolution mesh as a current grid, and filtering out candidate ground points in the current grid by:
  selecting a preset number of points in the current grid randomly as a ground reference point set, wherein, the ground reference point set comprises at least one ground reference point;
  selecting a point one by one from the ground reference point set as a current point;
  for each current point, calculating a difference between a height value of the current point and a height value of each ground reference point to obtain a plurality of differences, and determining the current point as a candidate ground point in response to determining that more than half of the plurality of differences are lower than a preset threshold, so as to determine all candidate ground points in the current grid.

7. The electronic device of claim 6, wherein, performing the ground fitting based on the candidate ground points in the low resolution mesh comprises:
  determining a distance between each grid in the low resolution mesh and a predetermined center position; and
  performing the ground fitting based on the candidate ground points in each grid in the low resolution mesh respectively according to an ascending order of the distance between each grid in the low resolution mesh and the predetermined center position.

8. The electronic device of claim 7, wherein, performing the ground fitting based on the candidate ground points in each grid in the low resolution mesh respectively according to the ascending order of the distance between each grid in the low resolution mesh and the predetermined center position comprises:
  determining initial grids around the predetermined center position, and performing the ground fitting in each initial grid based on the candidate ground points in each initial grid to determine ground points in each initial grid; and
  based on the ascending order of the distance between each grid in the low resolution mesh and the predetermined center position, performing the ground fitting on each of remaining grids in the low resolution mesh sequentially until the ground fitting is performed on all the grids in the low resolution mesh by:
  for a current grid to be fitted, performing primary filtering on the candidate ground points in the current grid to be fitted based on an average value of height values of center points of fitted grids in 8 neighborhoods around the current grid to be fitted to obtain filtered candidate ground points, and performing the ground fitting on the current grid to be fitted based on the filtered candidate ground points.

9. The electronic device of claim 7, further comprising:
  for a target grid in the low resolution mesh in which the ground is failed to be fitted, determining a ground equation of the target grid based on ground equations fitted in 8 neighborhoods around the target grid.

10. The electronic device of claim 9, wherein, determining the ground equation of the target grid based on the ground equations fitted in the 8 neighborhoods around the target grid comprises:

obtaining a number of ground points in each of at least one grid fitted with the ground around the target grid;

determining a weight of each of the at least one grid fitted with the ground based on the number of ground points; and obtaining the ground equation of the target grid by performing weighted averaging on a ground equation and the weight of each of the at least one grid fitted with the ground.

11. A vehicle, comprising: a vehicle body, a laser radar, and an electronic device, the electronic device comprising:

one or more processors, and a memory, configured to store one or more programs that, when executed by the one or more processors, cause the one or more processors to implement a ground detection method, the method comprising:

projecting a laser point cloud obtained to a high resolution mesh and a low resolution mesh respectively;

filtering out candidate ground points in the high resolution mesh; and performing ground fitting based on the candidate ground points in the low resolution mesh; wherein, filtering out the candidate ground points in the high resolution mesh comprises:

selecting a grid one by one from the high resolution mesh as a current grid, and filtering out candidate ground points in the current grid by:

selecting a preset number of points in the current grid randomly as a ground reference point set, wherein, the ground reference point set comprises at least one ground reference point;

selecting a point one by one from the ground reference point set as a current point;

for each current point, calculating a difference between a height value of the current point and a height value of each ground reference point to obtain a plurality of differences, and determining the current point as a candidate ground point in response to determining that more than half of the plurality of differences are lower than a preset threshold, so as to determine all candidate ground points in the current grid.

12. The vehicle of claim 11, wherein, performing the ground fitting based on the candidate ground points in the low resolution mesh comprises:

determining a distance between each grid in the low resolution mesh and a predetermined center position; and performing the ground fitting based on the candidate ground points in each grid in the low resolution mesh respectively according to an ascending order of the distance between each grid in the low resolution mesh and the predetermined center position.

13. The vehicle of claim 12, wherein, performing the ground fitting based on the candidate ground points in each grid in the low resolution mesh respectively according to the ascending order of the distance between each grid in the low resolution mesh and the predetermined center position comprises:

determining initial grids around the predetermined center position, and performing the ground fitting in each initial grid based on the candidate ground points in each initial grid to determine ground points in each initial grid; and based on the ascending order of the distance between each grid in the low resolution mesh and the predetermined center position, performing the ground fitting on each of remaining grids in the low resolution mesh sequentially until the ground fitting is performed on all the grids in the low resolution mesh by:

for a current grid to be fitted, performing primary filtering on the candidate ground points in the current grid to be fitted based on an average value of height values of center points of fitted grids in 8 neighborhoods around the current grid to be fitted to obtain filtered candidate ground points, and performing the ground fitting on the current grid to be fitted based on the filtered candidate ground points.

14. The vehicle of claim 12, further comprising:

for a target grid in the low resolution mesh in which the ground is failed to be fitted, determining a ground equation of the target grid based on ground equations fitted in 8 neighborhoods around the target grid.

15. The vehicle of claim 14, wherein, determining the ground equation of the target grid based on the ground equations fitted in the 8 neighborhoods around the target grid comprises:

obtaining a number of ground points in each of at least one grid fitted with the ground around the target grid;

determining a weight of each of the at least one grid fitted with the ground based on the number of ground points; and obtaining the ground equation of the target grid by performing weighted averaging on a ground equation and the weight of each of the at least one grid fitted with the ground.

* * * * *